US007968061B2

(12) United States Patent
Goodwin

(10) Patent No.: US 7,968,061 B2
(45) Date of Patent: Jun. 28, 2011

(54) MICROPLATE WITH DIALYSIS MEMBRANE

(75) Inventor: Joseph J. Goodwin, Littleton, MA (US)

(73) Assignee: Becton, Dickinson and Company, Franklin Lakes, NJ (US)

( * ) Notice: Subject to any disclaimer, the term of this patent is extended or adjusted under 35 U.S.C. 154(b) by 626 days.

(21) Appl. No.: 11/249,587

(22) Filed: Oct. 13, 2005

(65) Prior Publication Data

US 2007/0280860 A1 Dec. 6, 2007

Related U.S. Application Data

(60) Provisional application No. 60/619,657, filed on Oct. 18, 2004.

(51) Int. Cl.
*B01L 3/00* (2006.01)
*G01N 1/40* (2006.01)

(52) U.S. Cl. .............. 422/534; 210/321.71; 210/321.75; 435/288.4

(58) Field of Classification Search .................. 422/101, 422/102, 534; 435/297.1, 297.2, 297.5, 288.4; 210/321.71, 321.75
See application file for complete search history.

(56) References Cited

U.S. PATENT DOCUMENTS

| | | | | |
|---|---|---|---|---|
| 4,180,383 | A * | 12/1979 | Johnson | 422/69 |
| 5,116,496 | A * | 5/1992 | Scott | 210/232 |
| 5,516,490 | A * | 5/1996 | Sanadi | 422/101 |
| 5,801,055 | A * | 9/1998 | Henderson | 435/297.5 |
| 6,458,275 | B1 * | 10/2002 | Shukla et al. | 210/321.6 |
| 7,156,996 | B2 * | 1/2007 | Watzele et al. | 210/321.71 |
| 2005/0103703 | A1 * | 5/2005 | Young et al. | 210/450 |

FOREIGN PATENT DOCUMENTS

| | | |
|---|---|---|
| WO | WO 02/102962 | 12/2002 |
| WO | WO 03/049841 | 6/2003 |

OTHER PUBLICATIONS

Communication pursuant to Article 96(2) EPC, European Patent Office, European Patent Application No. 05 109 669.1-2113, Oct. 10, 2006.

* cited by examiner

*Primary Examiner* — Jill Warden
(74) *Attorney, Agent, or Firm* — Hoffman & Baron, LLP

(57) ABSTRACT

A microplate is provided herein having a plate body with at least one well formed therein, the well having a first open end, a second end, an aperture being formed in the second end, and a side wall extending between the first end and the second end. The microplate further has a dialysis membrane extending at least partially across the aperture formed in the second end. Advantageously, with the subject invention, a microplate is provided with a dialysis membrane which allows not only for removal of certain solutes from a solution (high or low molecular weight solutes), but also allows for separation of macromolecular mixtures. Accordingly, a solution may be manipulated with the subject invention to have its concentration altered, to be desalted, and/or to be fractionated.

6 Claims, 3 Drawing Sheets

MICROPLATE WITH DIALYSIS MEMBRANE

CROSS-REFERENCE TO RELATED APPLICATION

This application claims priority of U.S. Provisional Patent Appl. No. 60/619,657, filed Oct. 18, 2004, the entire contents of which are hereby incorporated by reference.

FIELD OF THE INVENTION

This invention relates to microplates and, more particularly, to microplates having dialysis membranes.

BACKGROUND OF THE INVENTION

Microplates are known in the art and are commonly used for bioassays. A microplate may be a single-well or multiwell device. A multiwell plate may include an array of wells, typically having 24, 96, 384, or 1,536 wells. The wells are generally cup-shaped and formed to accommodate various chemical and/or biological fluids and matters in conducting parallel bioassays, such as with parallel drug screening. Because of the commonplace use of microplates, standard dimensions of the plates have been developed to facilitate use with pick-and-place machines.

SUMMARY OF THE INVENTION

A microplate is provided herein having a plate body with at least one well formed therein, the well having a first open end, a second end, an aperture being formed in the second end, and a side wall extending between the first end and the second end. The microplate further has a dialysis membrane extending at least partially across the aperture formed in the second end. Advantageously, with the subject invention, a microplate is provided with a dialysis membrane which allows not only for removal of certain solutes from a solution (high or low molecular weight solutes), but also allows for separation of macromolecular mixtures. Accordingly, a solution may be manipulated with the subject invention to have its concentration altered, to be desalted, and/or to be fractionated.

Although, as will be appreciated by those skilled in the art, the subject invention is useable in various applications, it is particularly well-suited to be used in evaluating serum binding, such as evaluating prospective drug compound binding to serum proteins.

The dialysis membrane preferably has a molecular weight cut off in the range of about 10,000 to about 80,000 dalton, and, more preferably, in the range of about 12,000 to about 14,000 dalton.

These and other features of the invention will be better understood through a study of the following detailed description and accompanying drawings.

DETAILED DESCRIPTION OF THE INVENTION

Figure 1:
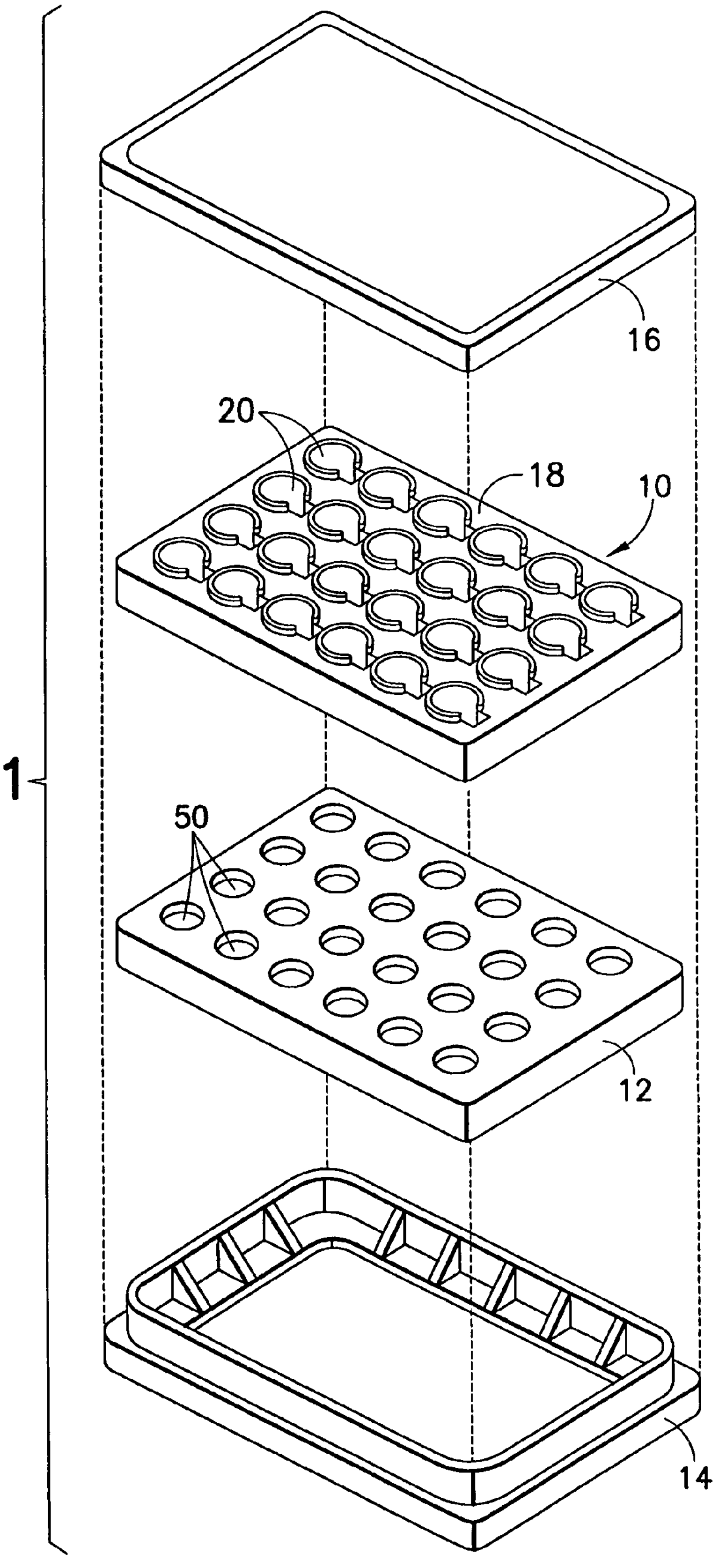
FIG. 1 is an exploded perspective view of an assembly useable with the microplate of the subject invention.

A microplate is provided herein having a dialysis membrane and is generally designated with the reference numeral 10. As will be recognized by those skilled in the art, the microplate 10 can be utilized as a multiwell insert with a test microplate 12 having closed wells, as is known in the art. A feeder tray 14 and a lid 16 may also be provided as is known in the art. The microplate 10 can also be used directly with the feeder tray 14, or other vessel. The test microplate 12, the feeder tray 14 and the lid 16 may be of any known configuration.

With general reference to the figures, the microplate 10 includes a plate body 18 having one or more wells 20 formed therein. Each well 20 has a first open end 22 and a second end 24, through which an aperture 26 is formed. A side wall 28 extends between the first open end 22 and the second end 24. The side wall 28 is generally tubular and may be formed of various cross-sectional shapes. It is preferred that the side wall 28 be convergently formed in a direction towards the second end 24, such that the aperture 26 defines a smaller cross-sectional area than opening 27 defined by the first open end 22.

The plate body 18 can be formed to any set of dimensions, including standard dimensions which have been developed to facilitate use with pick-and-place machines. For example, the plate body 18 may be formed with dimensions defined by the standards of the Society for Biomolecular Screening (e.g., Standards SBS-1 through SBS-5). In addition, any number of the wells 20 may be provided with a plurality of the wells 20 being provided in any array (such as typical 24, 96, 384, or 1,536 well arrangements).

Figure 2:
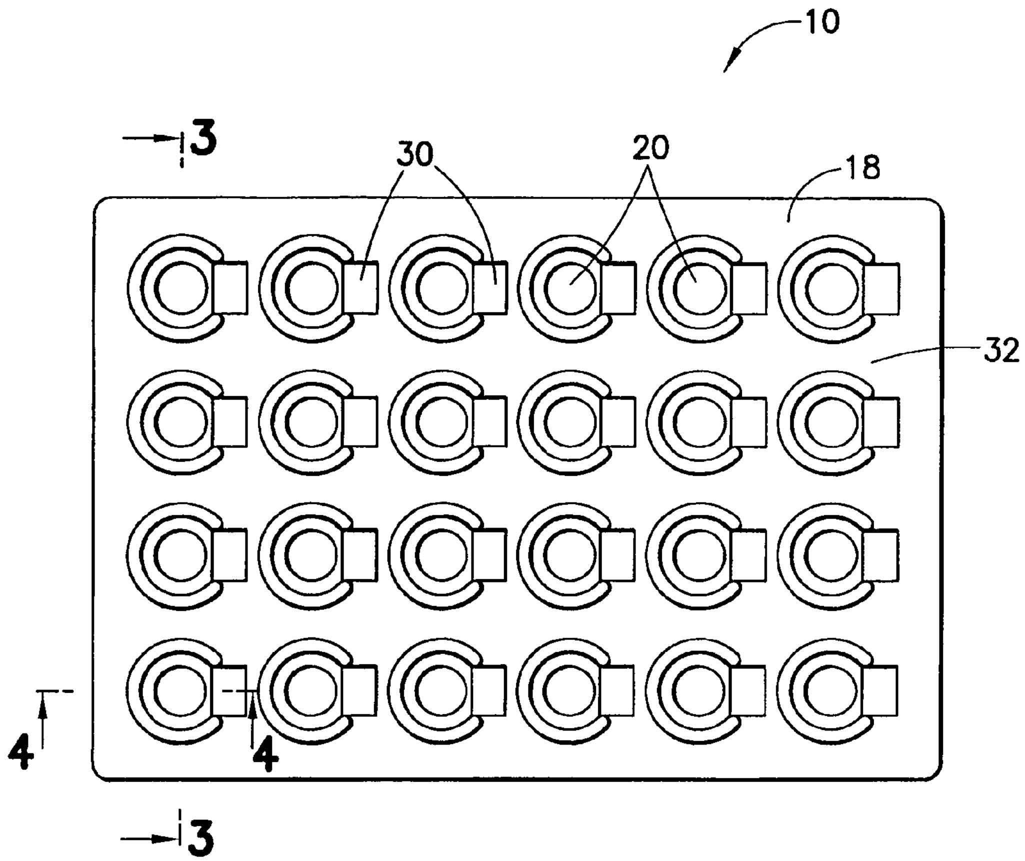
FIG. 2 is a top plan view of the microplate of the subject invention.
Figure 3:
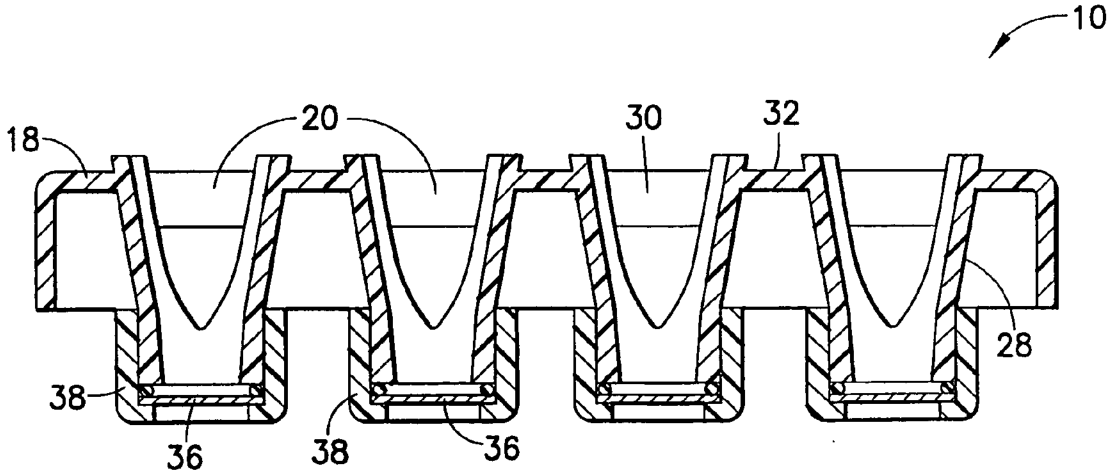
FIG. 3 is a cross-sectional view taken along line 3-3 of FIG. 2.
Figure 4:
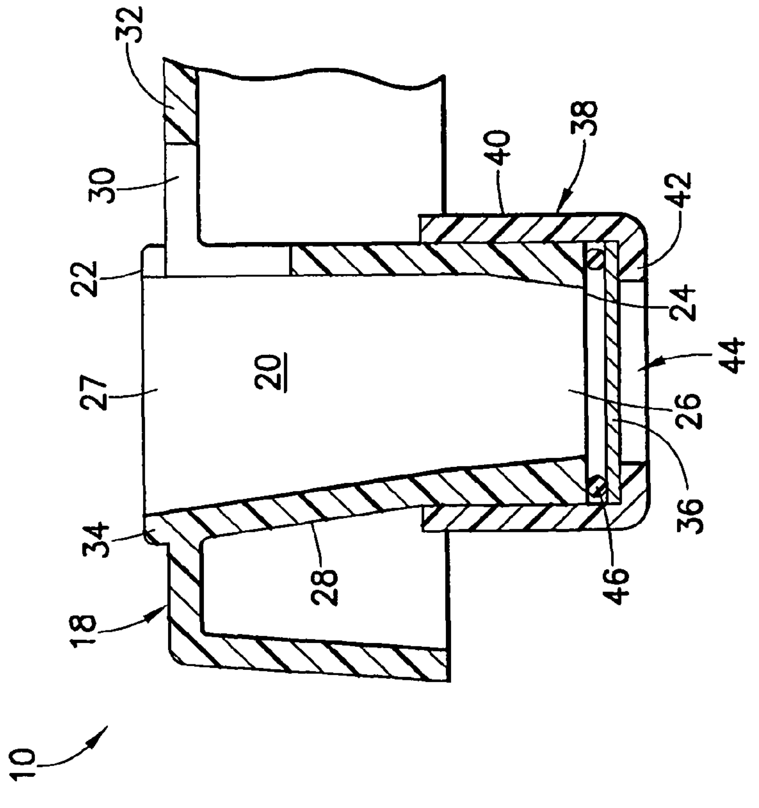
FIG. 4 is a partial cross-sectional view taken along line 4-4 of FIG. 2.

With reference to FIGS. 2-4, it is preferred that an access port 30 be provided adjacent each of the first open ends 22 of the wells 20. As best shown in FIG. 4, the access ports 30 extend through a top 32 of the plate body 18. The top 32 is generally coextensive with the first open ends 22 and bounds the wells 20. It is further preferred that the access ports 30 also extend through a portion of the respective side walls 28. Optionally, a flange 34 may circumscribe at least a portion of each of the first open ends 22. With the access ports 30 being provided, the flanges 34 are preferably interrupted thereby, with the access ports 30 extending through the flanges 34 and communicating with the openings 27.

A dialysis membrane 36 extends at least partially across each of the apertures 26 formed in the second ends 24 of the wells 20. Preferably, the dialysis membrane 36 has a molecular weight cut off in the range of about 10,000 dalton to about 80,000 dalton. More preferably, the dialysis membrane 36 has a molecular weight cut off in the range of about 12,000 dalton to about 14,000 dalton. The dialysis membrane 36 can be formed from any known material. By way of non-limiting example, the dialysis membrane 36 can be formed of regenerated cellulose.

The dialysis membrane 36 can be held relative to the respective second end 24 using any known technique. By way of non-limiting example, end caps 38 may be provided each having a tubular engaging side wall 40 sized for telescoping engagement about the side wall 28 of the corresponding well 20. The engaging side wall 40 may terminate with an inwardly-extending rim 42 sized and shaped to define an opening 44 at one end of the end cap 38. It is preferred that the opening 44 be larger than the corresponding aperture 26. The dialysis membrane 36 is disposed between the rim 42 and the side wall 28, with portions of the rim 42 overlapping portions of the dialysis membrane 36. It is preferred than an elastomeric member 46 be provided and interposed between the dialysis membrane 36 and the side wall 28. Preferably, the elastomeric member 46 is an o-ring, and, preferably, the elastomeric member 46 is formed of silicone rubber.

With the end cap 38 being fixed to the side wall 28, as shown in FIG. 4, the dialysis membrane 36 is trapped between, and held by, the rim 42 and the side wall 28 such that the dialysis membrane 36 is held relative to the respective second end 24. The elastomeric member 46, if used, provides conformal backing for the dialysis membrane 36. The end cap 38 may be fixed to the side wall 28 in any known matter, including by bonding (such as with adhesive), fusing (such as by ultrasonic welding), and/or mechanical fixation (such as by an interference fit).

It is preferred that all of the components used in the microplate 10 (e.g., the plate body 18; the dialysis membranes 36; the end caps 38; the elastomeric members 46) be compatible with any chemical and biological testing that is intended for the microplate 10.

Figure 5:
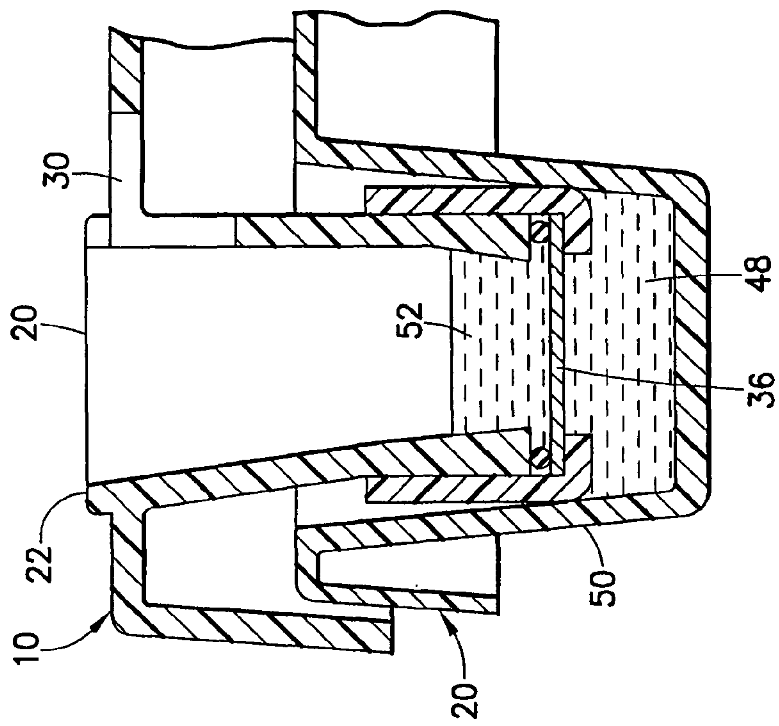
FIG. 5 is a schematic showing a well of the microplate of the subject invention conducting dialysis with a closed well of a test microplate.

With reference to FIG. 5, an exemplary dialysis procedure using the invention is depicted. To illustrate the subject invention, dialysis to evaluate binding of a prospective drug compound to serum proteins is discussed. Other applications are useable with the subject invention. To evaluate serum binding, a solution 48 containing the relevant serum proteins and the prospective drug compound is placed into a closed well 50 of the test microplate 12 and a buffer solution 52 is placed into the well 20 of the microplate 10. Thereafter, the microplate 10 is placed atop the test microplate 12 with the well 20 of the microplate 10 nesting within the closed well 50 of the test microplate 12 and the dialysis membrane 36 contacting the solution 48. Dialysis through the dialysis membrane 36 then occurs between the solution 48 and the buffer solution 52. To evaluate mass balance between the solution 48 and the buffer solution 52, a probe (not shown) may be inserted, through the first open end 22 and into the buffer solution 52 above the dialysis membrane 36, and a second probe (not shown) may be inserted through the access port 30 into the closed well 50 below the dialysis membrane 36. The degree of drug binding occurring in the solution 48 can be evaluated.

As will be appreciated by those skilled in the art, dialysis can occur on a one-to-one correspondence between the wells 20 of the microplate 10 and the closed wells 50 of the test microplate 12. In this manner, parallel testing can occur. In addition, dialysis can occur between multiple wells 20 and a common vessel. For example, the wells 20 may be introduced into a dish or the feeder tray 14 with a plurality of the wells 20 communicating with the same solution. It is envisioned that most commonly, the microplate 10 will act as a plate insert with the wells 20 being in a one-to-one correspondence with the closed wells 50 of a test microplate.

The feeder tray 14 and/or the lid 16 may be used during transportation of the microplate 10 to maintain cleanliness thereof. Also the feeder tray 14 and/or the lid 16 may be used during a dialysis procedure to facilitate handling by pick-and-place machines or other automated equipment.

Various changes and modifications can be made in the present invention. It is intended that all such changes and modifications come within the scope of the invention as set forth in the following claims.

What is claimed is:

1. A microplate comprising:

a plate body having at least first and second wells formed therein, said first and second wells each having a first open end, a second end, an aperture being formed in said second end, and a side wall extending between said first end and said second end, said side wall encompassing an interior;

a first dialysis membrane adjacent said second end, opposite said interior, and extending at least partially across said aperture of said first well, a second dialysis membrane adjacent said second end, opposite said interior, and extending at least partially across said aperture of said second well, said first and second dialysis membranes being separate and out of contiguous contact;

an elastomeric member interposed between said first dialysis membrane and said side wall of said first well; and, an end cap fixed to said side wall of said first well, said end cap having an inwardly-extending rim overlapping portions of said first dialysis membrane and defining an opening, wherein said opening being larger than said aperture of said first well.

2. A microplate as in claim 1, wherein said first dialysis membrane has a molecular weight cut off in the range of about 10,000 dalton to about 80,000 dalton.

3. A microplate as in claim 2, wherein said first dialysis membrane has a molecular weight cut off in the range of about 12,000 dalton to about 14,000 dalton.

4. A microplate as in claim 1, wherein said rim of said end cap overlaps said elastomeric member.

5. A microplate as in claim 1, wherein said plate body includes a top at least partially bounding said first and second wells, said first open end of said first well being generally coextensive with said top, and wherein an access port extends through said top adjacent said first open end of said first well.

6. A microplate as in claim 5, wherein said access port extends through a portion of said side wall of said first well.

* * * * *